United States Patent [19]

Stroud

[11] 4,304,744

[45] Dec. 8, 1981

[54] METHOD OF FORMING SEALING GASKETS IN CONTAINER CLOSURES

[75] Inventor: Gaston A. Stroud, Great Staughton, England

[73] Assignee: W. R. Grace & Co., Cambridge, Mass.

[21] Appl. No.: 156,436

[22] Filed: Jun. 4, 1980

[30] Foreign Application Priority Data

Jun. 11, 1979 [GB] United Kingdom .............. 20195/79

[51] Int. Cl.³ .............................................. B29C 13/02
[52] U.S. Cl. ..................................... 264/25; 264/268; 425/174.8 R; 425/809
[58] Field of Search .......................... 264/268, 25, 26; 425/809, 174.8 R, 174.8 E

[56] References Cited

U.S. PATENT DOCUMENTS 2,835,926  5/1958  Maier et al. ......................... 425/809
2,881,475  4/1959  Wilckens ............................. 264/268

FOREIGN PATENT DOCUMENTS 1196543  6/1970  United Kingdom .
1327583  8/1973  United Kingdom .

OTHER PUBLICATIONS

"Plastics–Microwaves Pros & Cons", C. H. Will, SPE Journal, Nov. 1968, vol. 24, pp. 29-32.

Primary Examiner—James B. Lowe
Attorney, Agent, or Firm—David L. Weinstein; C. Edward Parker

[57] ABSTRACT

Method of forming a sealing gasket made from vinyl chloride resin plastisol in container closures made of a high-melting olefin polymer, especially polypropylene. The invention employs a combination of microwave heating and controlled heating by conventional means. The controlled conventional heating raises the temperature of the closure to from 5° to 35° C., preferably 5° to 15° C., below its melting point; at this temperature microwave heating is then introduced to flux the plastisol.

6 Claims, No Drawings

METHOD OF FORMING SEALING GASKETS IN CONTAINER CLOSURES

This invention relates to a method of forming sealing gaskets in container closures which are made of thermoplastic olefin polymers.

Container closures, for example bottle caps, are provided with a sealing gasket in order to seal the contents of the container from the atmosphere. The sealing gaskets are usually made by depositing in the closure a liquid, semi-liquid or paste-like material, distributing it in the closure to give the desired shape of gasket and causing the shaped material to solidify to form the gasket. The most satisfactory gasket-forming material of this kind is a dispersion of vinyl resin in a plasticiser, known as a "plastisol". The plastisol can be shaped most conveniently by spinning the cap, thereby producing a gasket which is thickest at the periphery of the cap, and subsequently fluxing it so that the vinyl resin absorbs the plasticiser to form what can be regarded as a solid solution and thereby producing a solidified gasket upon cooling.

The fluxing operation is conventionally carried out in a hot air oven, and for polyvinyl chloride, the vinyl resin most commonly used in making sealing gaskets, the fluxing temperature of a conventional plastisol usually reaches a minimum of about 170° C. before it is completely fluxed, i.e. is "fused". Complete fluxing corresponds to complete solvation of resin by plasticiser and maximum tensile strength of the resulting gasket. If fluxing is incomplete, the plasticiser is more easily extractable from the gasket by the contents of the container, thereby contaminating them and imparting a taste to the pack. Conditions commonly used for fluxing a conventional plastisol in a metal closure involve an oven pass-time from half to 2½ minutes using an oven air temperature of 190° to 250° C. As a result of the high minimum fluxing temperature (fusion temperature) required, polyvinyl chloride sealing gaskets have been used commercially only in closures made of metal, since closures made of the usual thermoplastic and thermoset resins are damaged when heated at such high temperatures. For example, thermoplastic closures become damaged by distortion or melting of the thermoplastic material, while the thermoset resins in general use contain water which is released by temperatures above 100° C. causing the gasket to blister.

The types of plastics materials usable for bottle caps are limited by price. Thermoset resins are cheaply available but have disadvantages. They are brittle, the caps tend to crack when subject to lateral impact, the phenol-formaldehyde etc, resin is usually incompletely reacted and the odorous gases slowly liberated from it impart a taste to the contents of the bottle and there is also the problem of blistering upon heating the cap, as mentioned above.

A particular class of plastics desirable for container closures is the high melting thermoplastic olefin polymers, especially polypropylene. The olefin polymers are easily injection-moulded into the form of closures and do not have the above-mentioned disadvantages of thermoset resins. Closures made of the olefin polymers are particularly desirable because of the lower head pressures required in closing a cap onto a bottle during the closing operation and thus reduced chance of breaking the glass of the bottle and therefore of lengthy interruptions to production. Also the protection afforded to the bottle neck and thread by the olefin polymer cap, which tends to absorb shock better than metal caps, gives the bottle a greatly improved "trip-life". It is estimated that the effective number of trips in the life of the bottle is increased by up to 6 times.

Olefin polymer caps can be moulded to include integral sealing devices, but these caps can be used generally only on glass with a perfect finish (not always available) and when the moulding of the cap is perfect. The difficulties involved in the inspection of moulded caps being made in vast numbers are serious. It is known also that the design of such moulded caps often requires modification to make an effective seal on a particular container. Thus, many polyolefin caps need to be gasketted. The disadvantages of inserted pre-formed gaskets are well known, i.e. the cost of insertion together with the danger of inserting more than one gasket into the cap or none at all. Thus, an ideal aim is to flow a vinyl resin plastisol into a closure made of an olefin polymer and subsequently flux the plastisol in situ in the closure until it forms a solid sealing gasket, as in the conventional process applied to metal caps. However, the maximum melting temperature of olefin polymer caps is close to the minimum fusion temperature of a plastisol, e.g. about 165° C. in the case of polypropylene, and therefore it is not possible to heat closures of olefin polymers to the temperatures normally used in the fluxing of plastisol sealants in metal caps as previously described.

Various unsuccessful attempts have been made to overcome the above problem. One approach has been to lower the fusion point of the plastisol, i.e. the minimum temperature required for fluxing it. This can be done by using a vinyl acetate/vinyl chloride copolymer resin in place of polyvinyl chloride itself. However, conventional plastisols of these resins do not generally have a sufficiently stable viscosity when the vinyl acetate content of the copolymer exceeds 5% by weight. Viscosity stability is of considerable importance when plastisols are sold in large batches. If, however the vinyl acetate content is 5% or less, the plastisol does not generally have a fusion temperature sufficiently low to enable the plastisol to be fluxed completely in olefin polymer caps by normal thermal heating.

It is possible to improve the viscosity stability of plastisols of vinyl acetate/vinyl chloride resins by substituting a plasticiser which has a slower solvating action on the resin, for example diisodecyl phthalate. Another way is to include in the plastisol a viscosity depressant, which may be a diluent, e.g. white mineral oil or an oil-soluble surface active agent e.g. a lauryl alcohol-ethylene oxide adduct. However, many viscosity depressants are unusable because of food laws or because they impart an undesired taste to the pack. Also, these variations often cause the fluxing temperature of the plastisol to increase and therefore have not solved the problem.

Another method of lowering the fluxing temperature or fusion point of a plasticiser is the use of faster-solvating plasticisers than the conventional dioctyl phthalate or diisooctyl phthalate, but the above-mentioned disadvantages of viscosity instability generally apply in this case also. Butyl benzyl phthalate is an example of a faster-solvating plasticiser. There is the added disadvantage that some of these faster-solvating plasticisers are extracted more easily by the pack (i.e. by the contents of the container) even when complete fusion is achieved.

A fourth attempt, described in W.R. Grace & Co's British Pat. No. 1,196,543, was based on inductive heating of a plastisol. In this method particles of an inductive material such as aluminum are introduced into the plastisol and the cap containing the plastisol is passed through a rapidly alternating magnetic field to flux it. This process suffers from the disadvantages that the particulate inductive material adds to the cost of the plastisol and care has to be taken to ensure that the particles remain in suspension in the plastisol and do not settle out before the plastisol is injected into the closure.

Yet another attempt, described in W.R. Grace & Co's British Patent Specification No. 1,327,583, was to use microwave energy to heat the plastisol. This was unsuccessful because it led to the overheating of the interior of the gasket and its subsequent degradation, in order to flux completely the surfaces of the gasket. This degradation leads to the liberation of hydrogen chloride and other malodorous by-products, which is clearly unacceptable, particularly in a gasket which is later to come into contact with a pack of an edible product. In addition, it is particularly necessary that the surface of the gasket which will come into contact with the pack be fluxed completely in order to avoid extraction of plasticiser etc. from the gasket into the pack.

We have now found a solution to the problem which enables gaskets to be formed inter alia from a conventional PVC resin plastisol in closures of high melting olefin polymers. The present invention provides a method of forming a sealing gasket in a container closure made of a high-melting olefin polymer which is substantially transparent to microwave radiation, which comprises introducing into the closure a vinyl resin plastisol which may have a fusion temperature above the melting temperature of the closure and forming it therein into the configuration of a gasket, heating the formed plastisol in the closure by microwave energy and heating the closure so that it acquires at the time of the microwave heating a temperature of from 5° C. to 35° C. below its melting point, the heating being carried out until the plastisol is completely fluxed, and cooling the plastisol to form the gasket. The preferred temperature range for the closure is from 5° to 15° C. below the melting point of the closure. The closure, being substantially transparent to microwave energy, is not heated by microwave energy to any significant extent. It is essential that while the plastisol is being heated by microwave energy the closure is kept at a temperature close, preferably as close as reasonably possible, to its melting point by application of some other kind of heating, referred to herein as "normal heating". As a practical matter it would be difficult to heat the closure from room temperature to the required temperature solely during exposure to microwave energy. Therefore the temperature required for the closure will normally be attained partly by pre-heating it (before the plastisol is heated by the microwave energy). The procedure will normally involve:

(1) pre-heating the closure containing the plastisol by normal means until a temperature close to the melting point of the closure is reached, usually in the range 15° to 5° C. below this melting point, preferably 10° to 5° C. therebelow, and preferably to bring the plastisol to a gel or partly fluxed state, and (2) raising the temperature of the plastisol by microwave heating to flux it completely.

The aim of the process of the invention is to minimise loss of heat from the plastisol during the microwave heating. Therefore it will normally be desirable to ensure that the atmospheric temperature near the surface of the plastisol during the microwave heating is as near as practical to the melting point of the closure, e.g. 10° to 5° C. below the melting point. Since the microwave heating step is normally carried out in an air oven, the above requirement will usually mean heating the air in the oven and/or supplying pre-heated air to it.

The closure containing the fluxed plastisol gasket can be cooled in any convenient way, e.g. merely allowed to cool in air, to a suitable temperature for further handling of the closures without damage to the closure.

The essence of the invention is that it has surprisingly been found possible to flux completely the plastisol which can be a conventional polyvinyl chloride plastisol, by a combination of microwave heating and normal heating, i.e. usually by conduction or radiation of longer wavelength. In this way even the surfaces are fluxed adequately. This is surprising because the conditions of the normal, thermal heating are not by themselves sufficient to enable the fusion (complete fluxing temperature) of the plastisol to be reached.

The invention is of particular applicability to closures made of polypropylene, which typically has a melting point of about 165° C. While the preferred features of the invention will be described hereinafter mainly with particular reference to polypropylene, it will be understood that the invention is applicable to other olefin polymers which are transparent to microwave radiation, principally the homopolymers and hydrocarbon copolymers. Naturally, the lower the melting point of the olefin polymer, the more difficult the invention becomes to carry out and it might be necessary to use a plastisol which strikes a balance in terms of its composition between those which give the disadvantages mentioned above and a conventional PVC plastisol with its relatively high fusion point. It is even contemplated, as a fairly extreme case that the invention will be applicable to closures of high density polyethylene, which typically has a melting point as low as 135° C. For this purpose it will be necessary to use a plastisol of low fusion point, e.g. about 140° C. which will probably suffer from the disadvantages explained above; however, since the prior process could not be carried out at all, the invention nevertheless represents a valuable technical advance in the art.

The temperature at which the closure is maintained during the microwave heating is from a usual upper temperature of 5° C. below the melting point of the closure down to a preferred lower temperature of about 40° C. below the fusion point of the plastisol. For polypropylene closures the preferred range of temperatures to which the closure is heated is 145°–160° C., 150°–160° C. being most preferred. A closure temperature of more than 35° C. below the melting point of the closure, i.e. typically below 130° C. for polypropylene, is unlikely to be useful for conventional plastisols. For a plastisol of lower fusion point a lower closure temperature is possible. The lower the melting temperature of the closure polymer the more desirable it will be to keep the closure temperature within the range of 5°–15° C. and preferably 5°–10° C. below the melting point. For a closure made of high density polyethylene, a preferred temperature range of about 120°–125° C. is therefore contemplated.

The normal heating is conveniently carried out by heating the air around the closure, e.g. in an ante-chamber to the microwave heating section of the oven. Naturally, it is desirable to transfer the closure from a pre-heating location upstream of a microwave oven with as little heat loss as reasonably possible. The closures will normally be positioned in a microwave oven in their inverted position (upside down compared with their position when secured on the neck of the container).

Various sequences of pre-heating are possible, as described hereinafter.

The plastisol used in the invention will normally be a plastisol of a vinyl chloride polymer, for example polyvinyl chloride itself or a copolymer of vinyl chloride with vinyl acetate. The vinyl chloride polymer (homopolymer or copolymer) can be in "paste grade" form. ("Paste grade" is a term of the art used to denote fine particle size resin made by emulsion polymerisation). In this event, the proportion of vinyl acetate units in the copolymer is preferably not more than 5 weight percent, on account of the problems of viscosity stability previously mentioned. Alternatively, part of the vinyl chloride polymer (homopolymer or copolymer) could be a "filler resin". This is the term of art for a relatively recently developed resin made by suspension polymerisation. The suspension polymer is of coarser particles and does not absorb the plasticiser so readily. It is said to be a polymeric "filler" for the paste grade resin, although it does absorb plasticiser during the heating of the plastisol. Such a filler resin can tolerate a higher vinyl acetate unit content in the copolymer, for example up to 14% by weight.

Other vinyl copolymers may be useful, e.g. a copolymer of 95% by weight vinyl chloride and 5% by weight of cyclohexyl maleiimide. Preferably the plastisol is selected so that its fusion temperature is not more than 15° C. above the melting temperature of the cap. It may of course be about the same or below the melting temperature of the cap by up to 10° C., depending on the balance desired between achieving complete fluxing most easily and avoiding the worst of the disadvantages of plastisols of low fusion point.

The proportion of plasticiser present in the vinyl resin plastisol may be any conventional proportion, tyically from 60 to 85 weight parts of plasticiser per hundred weight parts of vinyl resin. It is a particular advantage of the invention that conventional plasticisers, for example dioctyl phthalate or diisooctyl phthalate, which are readily available, can be used. Examples of other usable plasticisers are butyl benzyl phthalate, acetyl tributyl citrate, ethyl diphenyl phosphate and diisobutyl phthalate. One particular useful combination of plasticisers for use with a vinyl chloride/vinyl acetate copolymer resin is a mixture of diisodecyl phthalate and diiooctyl phthalate in a weight ratio of about 7-8:1.

The plastisols can contain any other conventional ingredients, for example a pigment, filler, heat stabiliser (to assist in stabilising the vinyl resin against decomposition), slip agent (i.e. additive for lowering the removal torque) or blowing agent. In connection with the last-mentioned ingredient, it should be explained that threaded closures are sometimes difficult to un-screw from the neck of the closure because of the tightness of the seal formed by the gasket, and it is therefore desirable to include a removal torque-reducing agent to assist this process. Many such agents are of course well known.

The filler content of the plastisol can be up to 200 weight parts per 100 weight parts of vinyl resin, depending on the specific gravity and oil absorption characteristics of the filler. For example a very high proportion of barytes can be used if it has a low oil absorption and its high specific gravity results in the addition of a proportionately small volume of particles. Normally, the proportion of most fillers will not exceed 50 weight parts on the above basis.

A convenient and usual procedure, which is preferably followed in the present invention, is to inject the plastisol in a liquid or semi-liquid state into the closure and subsequently distribute it in the desired configuration. For example it can be distributed by spinning the closure about the longitudinal axis thereof. The centrifugal force set up by the spinning procedures produces a gasket of "dished" configuration, the thickness of which is progressively greater in the radially outward direction. Alternatively, the desired configuration can be produced by moulding the plastisol within the closure. In a particularly preferred embodiment of the invention relating to a bottle cap, the cap is moulded to have an inner skirt portion in its centre, and the plastisol is injected into the annular space between the inner and outer skirts of the closure. However, any shape of cap and gasket and construction of cap can be used. The invention is applicable to a wide variety of closures for containers, but the field of possibly greatest interest is bottle caps. Naturally, the invention is of potential interest particularly for threaded caps in which the threads have been preformed in moulding the cap, and for snap-on caps. Either type may incorporate a pilfer-proof device. Such caps will usually have an internal diameter of about 25-32 mm. The invention is also particularly applicable to closures of wide-mouthed bottles and jars, e.g. of diameter 50 mm and upwards, usually 50-100 mm, preferably 68-100 mm.

The sequence of operations before the microwave heating step can be varied. In one procedure, the closure is first pre-heated and then the plastisol is introduced, preferably at a temperature of from 20° to 50° C., into the heated closure. The plastisol is then distributed in the required configuration, e.g. by spinning the cap as described above, and the heated cap containing the plastisol is then passed with as little loss of heat as possible to microwave oven. The pre-heating step is preferably carried out in an ordinary air oven.

In another possible sequence of operations, the platisol is first introduced into the closure, again preferably at a temperature of from 20°-50° C., and formed into the desired gasket-forming configuration, e.g. by spinning as described above, and the closure containing the plastisol is then subjected to the pre-heating step. This pre-heating step does not result in complete fusion, but normally brings the plastisol into a gel state.

The plastisol could be injected at a higher temperature and temperatures up to 70° C. are contemplated particularly.

The preferred pre-heating of the closure can be carried out before, after or even during introduction of the plastisol into the closure. It will normally be carried out at an air temperature of from 30° C. below, preferably from about 20° C. below, the melting temperature of the material of which the cap is made up to the highest temperature at which the cap can survive without damage. Thus, for polypropylene a temperature of from 135° to 160° C. is appropriate in most cases, with a period of heating of from 1 to 10 minutes.

The microwave heating is normally carried out in a microwave oven. The microwave frequency employed is not critical from the technical point of view, but is usually dictated by goverment regulations. The usable frequencies in the United Kingdom are 915 and 2450 Megahertz, although in principle any frequency in the range 300 to 300,000 Megahertz might be appropriate. The microwaves are scattered in the oven by any convenient means. It is important that the ambient temperature in the microwave oven should be sufficient to avoid substantial loss of heat from the pre-heated cap. Thus, in the case of a polypropylene cap, an ambient or air temperature of at least 140° C. in the microwave oven is currently considered preferred. A lower temperature than 130° C. leads to too great a heat loss and incomplete fluxing. The result of incomplete fluxing is that the required physical characteristics of the gasket would not be obtained and the plasticiser could be extracted from the gasket by certain packs, particularly the contents of bottles of drink.

Conveniently the caps are fed to a conveyor belt which runs through a pre-heating oven, in which they are air-heated, and then into a microwave oven. Excessive leakage of microwaves from the microwave oven into the air oven can be controlled by a choke device.

In a variation, the caps need not be fed to a pre-heating oven at all, but all the conventional heating and the microwave heating can be carried out in the same oven, for example by electric heaters on the skin of the microwave oven.

By way of example, when carrying out the method of the invention using polypropylene caps with a melting temperature of 165° C., we have obtained good results by first inserting the plastisol in the cap, distributing it by spinning to the required configuration, and heating the caps containing the plastisol in an air oven at an air temperature of 155° C. for about 3 minutes and then transferring them rapidly, in a closed vessel, to a heated microwave oven, where they are at an atmospheric temperature just above the surface of the plastisol of about 135° C. to 140° C. The temperature of the closure is about 135° to 145° C. The microwave heating is carried out for various times depending upon the power applied, using a frequency of 2450 Megahertz. While heating times can range from about 1 minute at 900 watts (full power) to 10 minutes at a very low power of 100 watts, we have found it convenient to operate at about 850 watts with a heating time of from about 1 to 1¼ minutes. Alternatives which we have tried successfully are (a) heating for about 1½ minutes at 700 watts and (b) heating for about ½ minute at 500 watts, followed by a minute at 900 watts. By this means, we have obtained gaskets of excellent quality without damage to the polypropylene cap.

The following Examples illustrate a variety of plastisols which can be used in the present invention. They are for polypropylene caps.

EXAMPLE 1

| | Parts by weight |
|---|---|
| Paste grade PVC resin | 60 |
| Suspension grade PVC resin of higher particle size ("filler resin") | 40 |
| Diisooctyl phthalate | 65 |
| Filler, talc, clay or barium Sulphate | 12.5 |
| Titanium dioxide | 2.5 |
| Heat stabiliser ("Lankro 152", a calcium-zinc epoxidised fatty acid ester) | 1.5 |

-continued

| | Parts by weight |
|---|---|
| Microcrystalline wax | 1.0 |

EXAMPLE 2

As Example 1 except that the "filler resin" is a copolymer of 5% by weight vinyl acetate with 95% by weight vinyl chloride.

EXAMPLE 3

As Example 1 except that the paste grade PVC resin is replaced by a copolymer of 5% by weight vinyl acetate with 95% by weight vinyl chloride.

EXAMPLE 4

| | Parts by weight |
|---|---|
| A paste grade resin of a copolymer of 5% by weight vinyl acetate with 95% by weight vinyl chloride | 100 |
| Diisodecyl phthalate | 71 |
| Diisooctyl phthalate | 9 |

Other ingredients (i.e. apart from the plasticiser and resin) are as for Example 1.

EXAMPLE 5

As for Example 4 except that 40 parts of the resin are replaced by the "filler resin" of Example 1.

EXAMPLE 6

As Example 1 except that 80 parts of diisooctyl phthalate are employed.

EXAMPLE 7

| | |
|---|---|
| Paste grade PVC resin | 60 |
| Filler resin as in Example 1 | 40 |
| Diisooctyl phthalate | 10 |
| Acetyl tri-butyl citrate | 50-65 |

These compositions have a desirable low viscosity.

EXAMPLE 8

As Example 7 but the plasticiser consists of 30-35 parts each of diisooctyl phthalate and acetyl tri-butyl citrate.

EXAMPLE 9

As Example 1 but the filler resin is a copolymer of 5% by weight of cyclohexyl maleiimide and 95% by weight of vinyl chloride.

All the above exemplified compositions can be further modified by adding up to 2 parts by weight of white mineral oil to improve the stability of their viscosity and up to about 2 parts by weight of a viscosity depressant. A preferred viscosity depressant is a lauryl alcohol-ethylene oxide adduct. Another modification is to include 5 parts by weight of an acrylonitrile-butadiene copolymer (30%:70% by weight) rubber. This material improves absorption of microwave energy by the composition. Preferably a conventional amount of a torque removal-reducing agent is also included.

I claim:

1. In a method of forming a sealing gasket in a container closure made of polypropylene which is substantially transparent to microwave radiation, in which one introduces into the closure a vinyl chloride resin plastisol, forms it therein into the configuration of a gasket, and heats the thus formed plastisol in the closure with the aid of microwave energy until the plastisol is completely fluxed and cools the plastisol to form the gasket, the improvement which comprises heating also the closure, so that it acquires at the time of the microwave heating a temperature of from 130° to 160° C.

2. A method according to claim 1, wherein the vinyl chloride resin is a paste grade resin of polyvinyl chloride or of a copolymer of vinyl chloride with up to 5 weight percent of vinyl acetate, or is a filler resin of polyvinyl chloride or of a copolymer of vinyl chloride with up to 14 weight percent of vinyl acetate.

3. A method according to claim 1 or 2, wherein the temperature of the closure is attained partly by pre-heating it before the plastisol is heated by microwave energy, and the temperature of the plastisol is raised by the microwave heating.

4. A method according to claim 3, wherein the closure containing the plastisol is pre-heated by a normal heating method until the closure acquires a temperature of 5° to 15° C. below its melting point, to bring the plastisol to a gel or partly fluxed state.

5. A method according to claim 4, wherein the temperature is from 5° to 10° C. below the melting point of the closure.

6. A method according to claim 3, wherein the closure is pre-heated, and the plastisol is introduced at a temperature of from 20° to 50° C. into the heated closure.

* * * * *